United States Patent
Goetzke et al.

(10) Patent No.: US 6,837,371 B1
(45) Date of Patent: Jan. 4, 2005

(54) OPTICAL MEDIA PACKAGE

(75) Inventors: Kurt E. Goetzke, Northfield, MN (US); John A. Verant, Shorewood, MN (US)

(73) Assignee: Willette Acquisition Corp., Minneapolis, MN (US)

( * ) Notice: Subject to any disclaimer, the term of this patent is extended or adjusted under 35 U.S.C. 154(b) by 55 days.

(21) Appl. No.: 10/429,664

(22) Filed: May 1, 2003

Related U.S. Application Data

(60) Provisional application No. 60/377,470, filed on May 1, 2002.

(51) Int. Cl.[7] .............................................. B65D 85/57
(52) U.S. Cl. ..................... 206/308.1; 206/312; 206/232
(58) Field of Search .................... 206/308.1, 308.3, 206/311, 312, 313, 387.13

(56) References Cited

U.S. PATENT DOCUMENTS

| | | | |
|---|---|---|---|
| 4,473,153 A | * 9/1984 | Colangelo | 206/312 |
| 4,640,413 A | * 2/1987 | Kaplan et al. | 206/232 |
| 5,085,318 A | 2/1992 | Leverick | 206/312 |
| 5,096,055 A | 3/1992 | Opper | 206/45.13 |
| 5,188,229 A | * 2/1993 | Bernstein | 206/308.1 |
| 5,248,032 A | 9/1993 | Sheu | 206/312 |
| 5,259,133 A | 11/1993 | Burtch | 40/124.1 |
| 5,265,721 A | 11/1993 | Castritis | 206/309 |
| 5,289,918 A | 3/1994 | Dobias | 206/312 |
| 5,333,728 A | 8/1994 | O'Brien | 206/232 |
| 5,421,452 A | 6/1995 | Hybiske | 206/312 |
| D360,360 S | 7/1995 | Kiolbasa | D9/433 |
| 5,450,953 A | 9/1995 | Reisman | 206/310 |
| D371,072 S | 6/1996 | Baker | D9/433 |
| 5,638,953 A | * 6/1997 | House | 206/308.1 |
| 5,647,482 A | * 7/1997 | Kleinfelder | 206/308.1 |
| D382,199 S | 8/1997 | Webinger | D9/346 |
| 5,809,673 A | 9/1998 | Johnson et al. | 40/124.08 |
| 5,887,714 A | 3/1999 | Yeo | 206/308.1 |
| 5,947,281 A | 9/1999 | Kaneff | 206/313 |
| 5,971,157 A | 10/1999 | Howell | 206/755 |
| 6,070,719 A | * 6/2000 | Pollock | 206/232 |
| 6,241,086 B1 | 6/2001 | Bergh | 206/308.1 |
| 6,279,739 B1 | 8/2001 | Moore | 206/312 |
| 6,290,060 B1 | 9/2001 | Burtch | 206/312 |
| 6,401,917 B1 | * 6/2002 | Smith | 206/232 |
| 6,446,800 B2 | 9/2002 | Bergh | 206/308.1 |
| 6,681,928 B1 | * 1/2004 | Siek et al. | 206/308.1 |
| 6,702,108 B2 | * 3/2004 | Lo Duca | 206/232 |

* cited by examiner

*Primary Examiner*—John A. Ricci
(74) *Attorney, Agent, or Firm*—Gray Plant Mooty Mooty & Bennett, P.A.; Peter Forrest

(57) ABSTRACT

Holders for thin objects, such as disc-shaped optical media, are assembled from single units of flat paper or card stock. The holder completely covers the object when closed, but projects the object without losing hold of it upon opening the holder like a book, so that the object may be easily gripped and removed from the holder.

11 Claims, 6 Drawing Sheets

OPTICAL MEDIA PACKAGE

CROSS REFERENCE TO RELATED APPLICATION

This application claims the benefit of provisional application No. 60/377,470 filed May 1, 2002.

FIELD OF THE INVENTION

This invention concerns foldable packages for pieces of thin objects such as disc-shaped optical recording media.

BACKGROUND OF THE INVENTION

Foldable holders for thin, disc-shaped optical media, such as optical discs of any variety (CD, CD ROM, DVD, etc.), are shown in U.S. Pat. No. 5,947,281 (Kanesf) and U.S. Pat. No. 5,971,157 (Howell, el al.). The entire disclosure of each of these is incorporated by reference into this application for purposes of providing background on the general nature of handling media in these types of packaging schemes.

BRIEF DESCRIPTION OF THE DRAWINGS

The accompanying drawings show a particular embodiment of the invention as an example, and are not intended to limit the scope of the invention.

DETAILED DESCRIPTION

Figure 1:
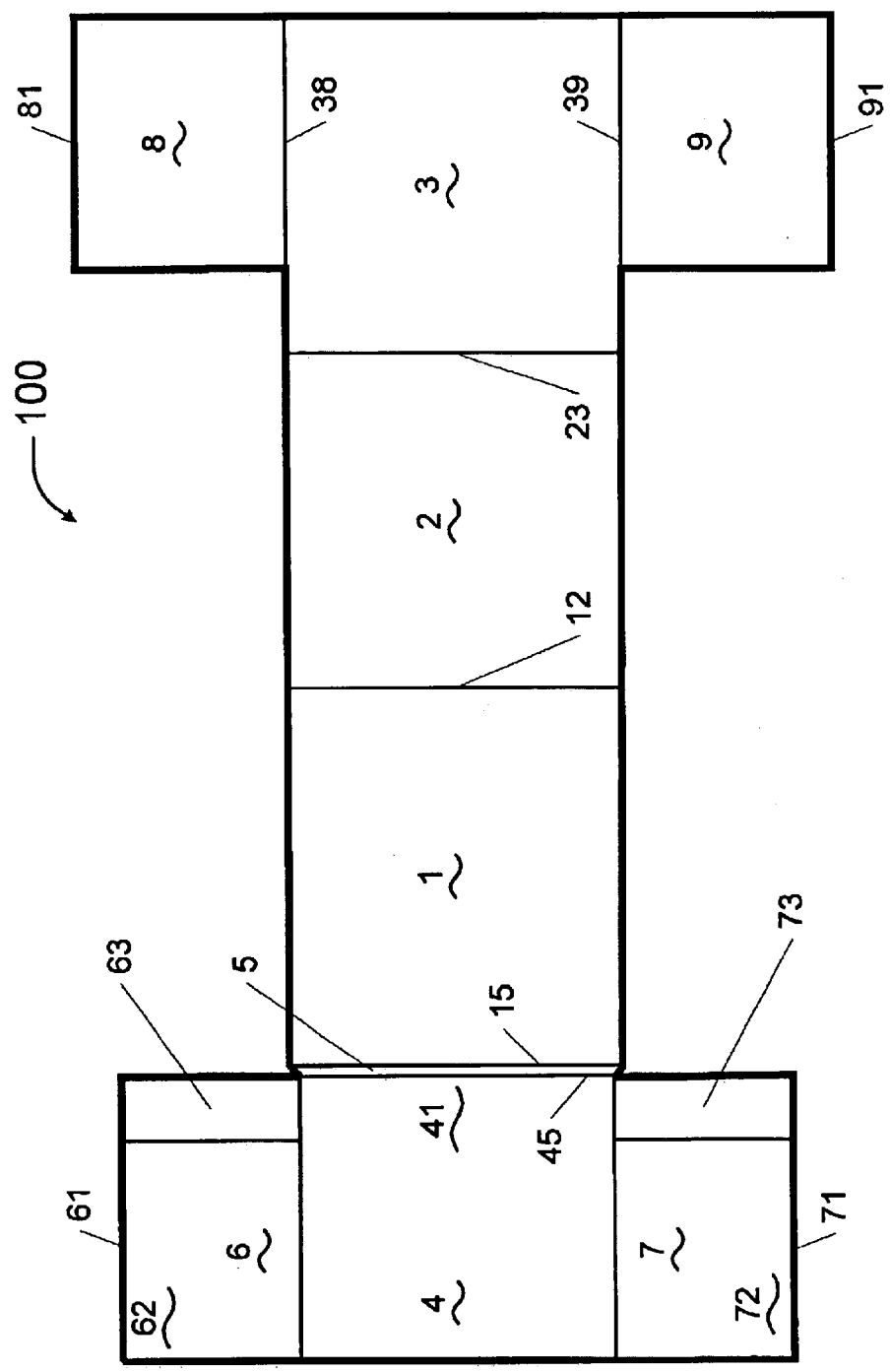
FIGS. 1 and 2 are plan views of two embodiments of the invention.

FIG. 1 is a plan view of a first embodiment of the invention, which is formed from a single "cut" of material, completely laid flat and unfolded to show its various components. In this and the other figures, a relatively thicker line indicates a cut line and a relatively thinner line indicates a fold line; dashed lines are used to indicate hidden cut or fold lines, or the outline of a piece of recording media M, in some of the figures.

In this first embodiment, media holder 100 comprises several generally rectangular contiguous sections: cover section 1, inside left section 2, inside right section 3, media pocket main section 4, spine 5 lying between cover section 1 and media pocket main section 4, two media pocket side sections 6 and 7, and two back panel sections 8 and 9. Each of these various sections is joined to its adjacent sections by fold lines, such as fold line 12 which joins cover section 1 and inside left section 2. Similar fold lines are labeled 23, 38, 39, 15, 45, 46, and 57 and join like numbered adjacent sections.

Figure 3:
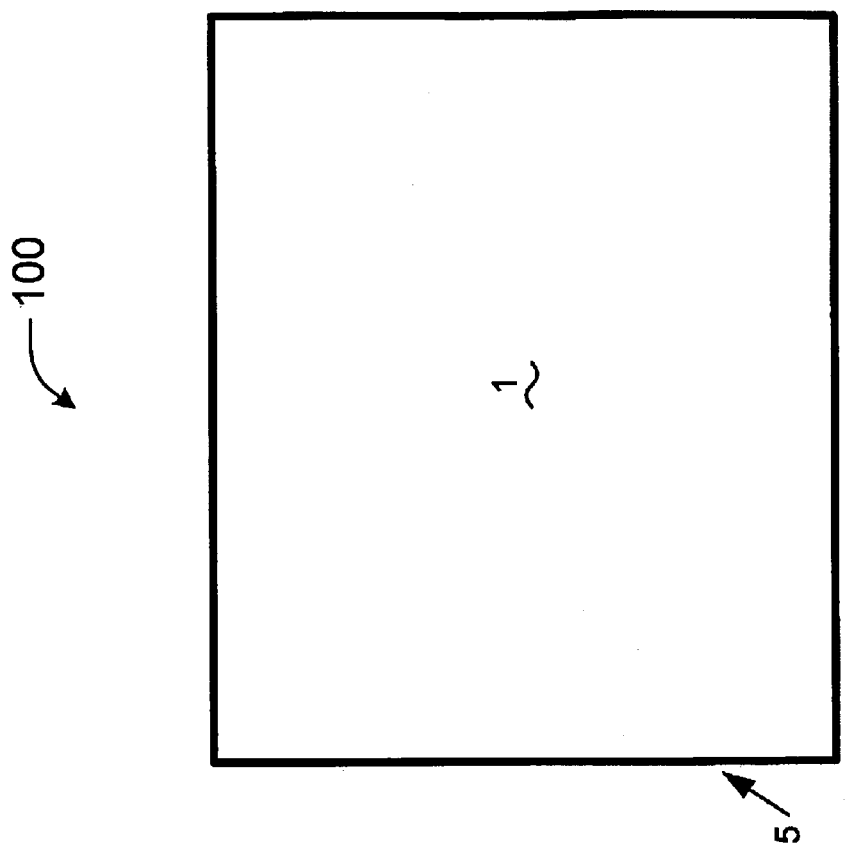
FIG. 3 is a front view of the embodiment of FIG. 1 when fully assembled and closed.
Figure 4:
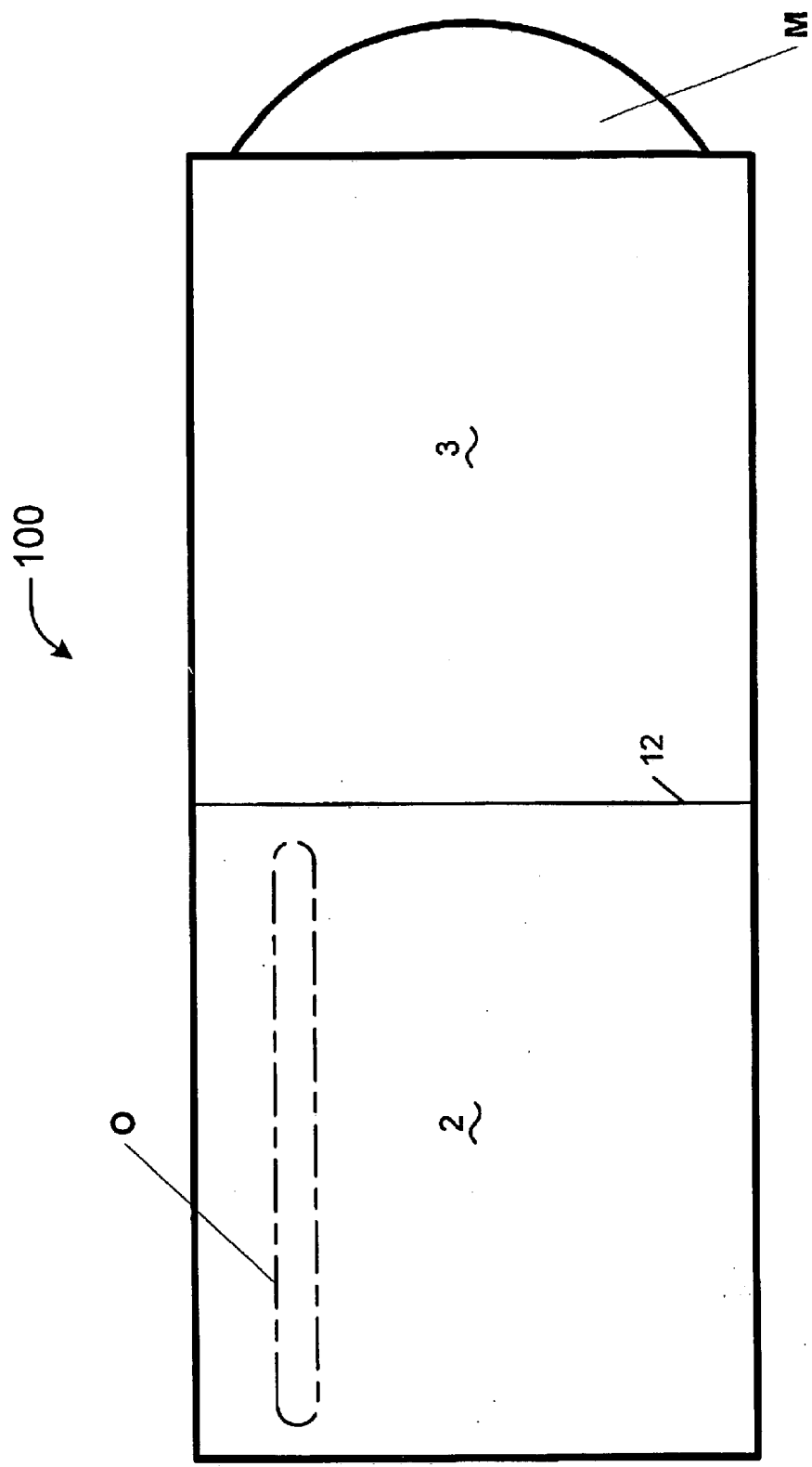
FIG. 4 is a front view of the embodiment of FIG. 3 when opened.
Figure 5:
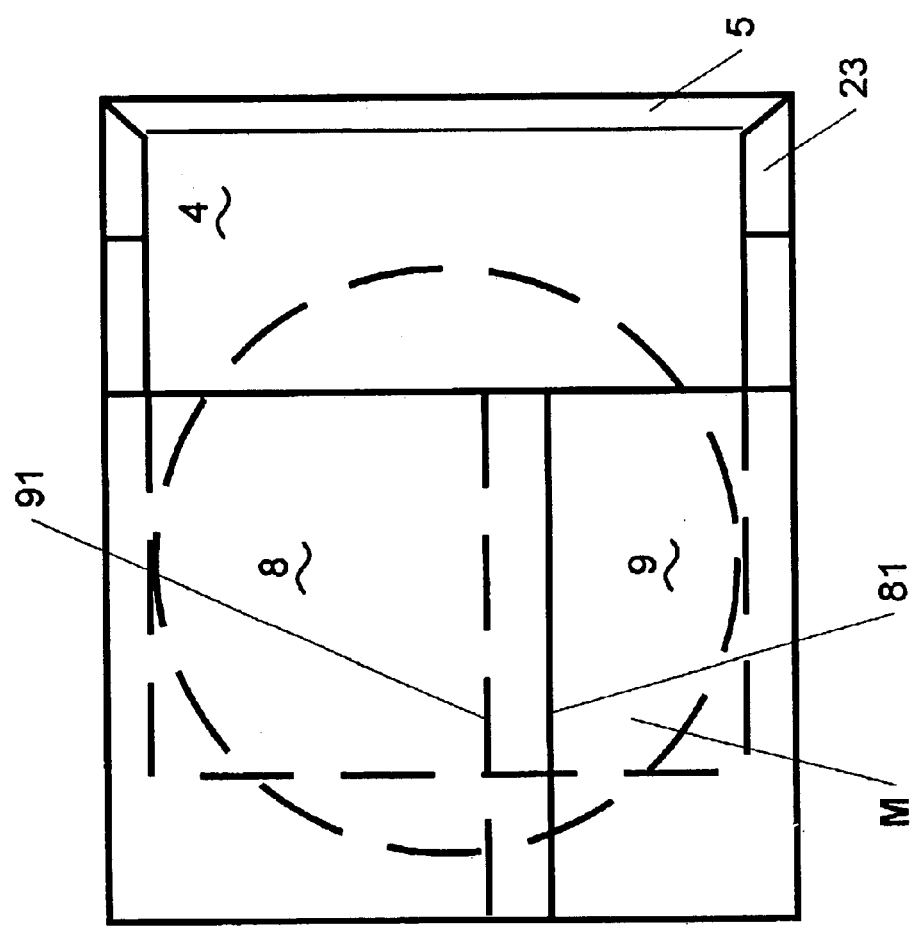
FIG. 5 is a back view of the embodiment of FIG. 3 when closed.
Figure 6:
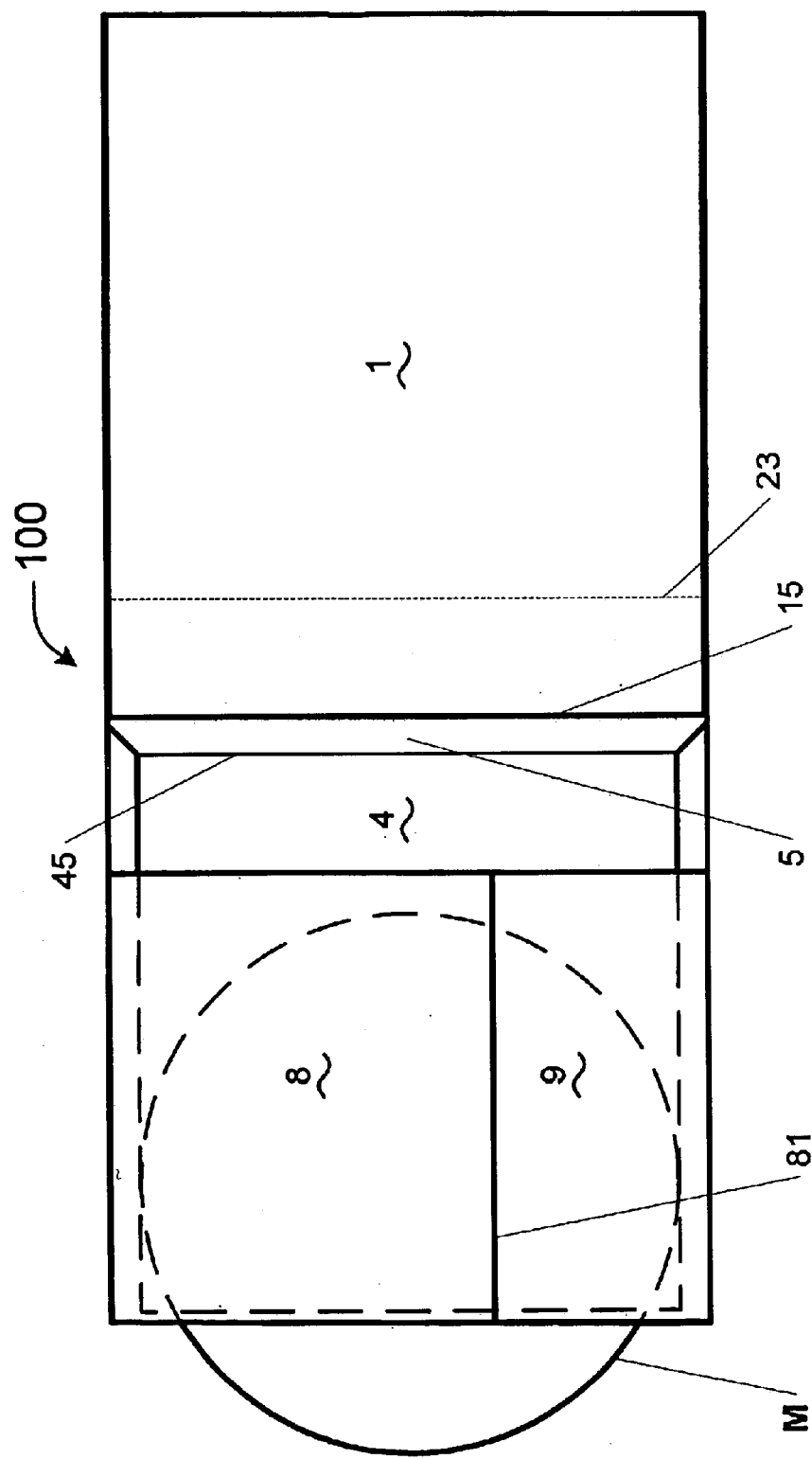
FIG. 6 is a back view of the embodiment of FIG. 3 when opened.

Holder 100 is assembled by folding along each of the fold lines and adhering certain sections together. The result is shown in FIGS. 3–6, with FIGS. 3 and 5 showing the media holder 100 in its closed position and FIGS. 4 and 6 showing media holder 100 in its open position.

The two media pocket side sections 6 and 7 are joined by overlapping edges 61 and 71 together and joining them to each other in any convenient manner, such as adhering edge regions 62 and 72 together with a conventional adhesive. This manner of joining together sections 6 and 7 is not a limitation on the scope of the invention, however. The media pocket is also formed by similarly adhering edge regions 63 and 73 to edge region 41 of the media pocket main section 4.

This produces a media pocket which is capable of holding the media without requiring a hub or similar feature projecting into any opening that may be present in the piece of recording media. The ability to hold the media yet without a complicated and/or costly hub or similar feature is an important advantage of the invention.

The assembled media pocket is then wrapped behind holder 100 by folding at lines 15 and 45, which places spine 5 at the conventional left side of the assembled holder, as it is viewed in the direction of cover section 1. Cover section 1 thus serves as the primary face or front cover of the assembled media holder 100. Additional folds are made at fold lines 12 and 23, such that inside left section 2 and inside right section 3 are located in the interior of the assembled media holder. The back of cover section 1 is adhered to the back of left section 2. The back face of media pocket main section 4 (not shown) lays against the back face of inside right section 3 (not shown). Back panel sections 8 and 9 are brought together by folding at lines 38 and 39, respectively, and joining back panel sections 8 and 9 together by overlapping edges 81 and 91 and joining them in any conventional manner, such as adhesive as described above with respect to media pocket side sections 6 and 7. Back panel sections 8 and 9 are joined together so that media pocket lies within a media holding sleeve formed by back panel sections 8 and 9 and the back face of inside right section 3.

In the most preferred embodiment for conventional 120 millimeter diameter optical disc recording media, inside left section 2 and inside right section 3 are approximately 5.275 inches in height (the vertical dimension as shown in the Figures) and 5.475 inches in width (the horizontal dimension as shown in the Figures). Cover section 1 is approximately 5.275 inches in height and 6.375 inches in width. Media pocket main section 4 is approximately 4.843 inches in height and approximately 4.475 inches in width. Spine 5 is approximately 0.168 inches in width and between approximately 5.275 and 4.483 inches in height depending on which end of the angled cut is the location of the measurement. Back panel top section 8 is approximately 3.300 inches in height and back panel bottom section 9 is approximately 3.000 inches in height.

The extended width of cover section 1, as compared to that of the inside left section 2 and inside right section 3, helps insure that, when the assembled media holder 100 is opened, the assembled media pocket extends out of the media holder 100 by approximately 1 inch, which provides a section of the media M that may be easily gripped for removal from the media holder 100.

Of course, these dimensions are not limitations on the scope of the invention, as they would depend upon the particular size of the piece of recording media and other design factors, such as the amount of the media that is desired to be exposed once the holder is opened, and the number of pieces of media desired to be held. In this regard, it is possible to provide the invention with dimensions suitable for a "double high" embodiment that holds two pieces of recording media, such as two of the 120 mm diameter disks described above, simply by scaling the height of the invention according to principles well within the ordinary level of skill in the art.

Figure 2:
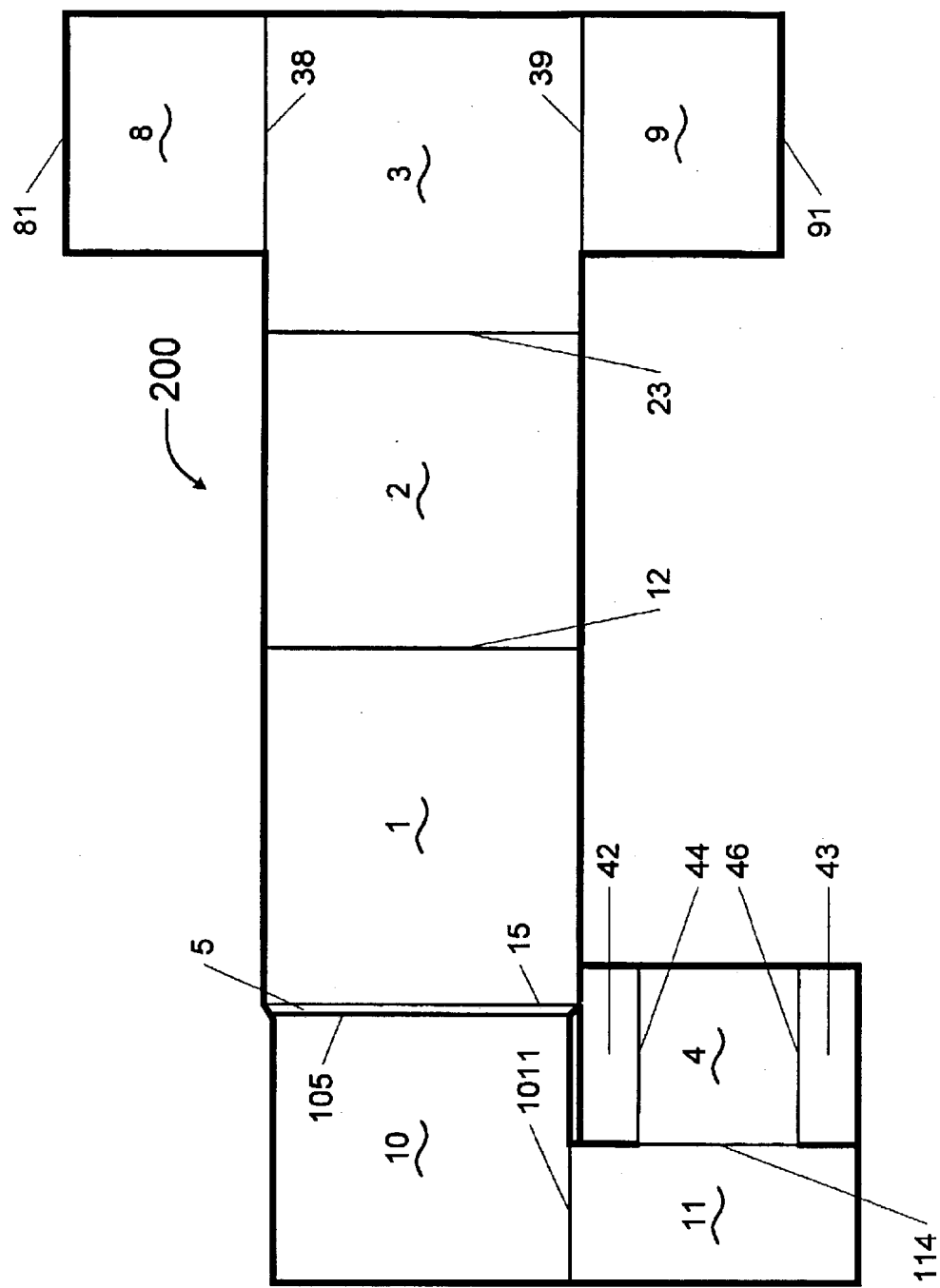

A second embodiment of the invention is shown in FIG. 2, which is a plan view in which similarly performing elements bear the same numbers as in FIG. 1. The embodiment of FIG. 2 is preferred for holding a so-called "business card" optical disc (not shown). Such disks are typically approximately 80 millimeter diameter disks that have been cropped to approximately 63 millimeters in width as measured between two opposite edges. Other possible sizes are 85 mm by 58 mm, 90 mm by 58 mm, and so on.

Media holder 200 comprises back extension section 10 which is attached to spine 5 at fold line 105. Media pocket main section 4 extends from side extension section 11 (it is attached at fold line 114), and back extension section 10 is attached to side extension section 11 at fold line 1011.

This embodiment is assembled in a manner similar to that of the embodiment of FIG. 1, that is, back panel sections 8 and 9 are brought together and joined to each other in any conventional manner. Edge sections 42 and 43 are folded at fold lines 44 and 46, respectively, so that edge sections 42 and 43 may be adhered to the backside (not shown) of section 11, providing a pocket into which the smaller media may be inserted. Side extension section 11 is folded to the backside (not shown) of back extension section 10, and thus when back extension section 10 is folded at fold line 105 such that it is adjacent the backside (not shown) of inside right section 3, it may be held in place behind back panel sections 8 and 9 once they are folded (at fold lines 38 and 39) and attached to each other. The end result is again a media holder in which opening up the media holder, i.e., unfolding fold line 23 once the media holder is fully assembled, extends the position of the media outwardly so that it may be easily gripped for removal from media package 200.

It is possible, but not required, for printing and other graphic elements to be included in the media holder as desired. Similarly, it is possible but not required to add various other elements not illustrated here, such as a die cut opening in the face of one or more openings, such as the illustrative opening O shown in phantom on the inside left section 2 of FIG. 4, so that a brochure or other printed material that accompanies the piece of media can be included. The shape, dimensions, orientation angle, and other similar parameters of the opening are not limitations on the scope of the invention. It is also possible to adhere or otherwise attach or include a flat object (such as the brochure or other printed material just noted, or another similar object) to either section.

While any heavy paper or cardstock is suitable for the invention provided it can be cut and bent as described above, the preferred board stock is known as SBS CIS (solid bleached sulfate, coated one side), having a the weight in the range from approximately from 100 lb to 17 pt, with 12 pt the most preferred. As is known in the art, the selection of material influences the selection of adhesive, and vice versa, but any adhesive providing suitable bonding strength, peel test characteristics, and the like is suitable. The preferred adhesives are cold extrusion adhesives, but hot-melt adhesives are also believed to be acceptable.

In this vein, it should be understood in the above description and in the following claims that the word "adhere" and its variants (adhesive, adhesion, etc.) are to read as broadly defining the concept of joining or forming attachment between various parts, and thus are intended to include other conventional and equivalent attachment mechanisms, such as adhesive tapes (whether single-sided or double-sided in their use of adhesive).

The following claims may use the language "first," "second," "third," and so on to specifically distinguish between various elements that are otherwise similarly named, such as fold lines, edges, and the like. These terms are not intended to imply any order of importance or time sequence in the manufacturing or use of the invention, unless other claim language specifically does so.

It is also clear that the manner in which the optical or recording media performs its recording function is not a limitation on the scope of the invention, and that the invention can be employed with any media that is relatively flat and otherwise similar to the conventional media described above.

In fact, it is not required that the object inserted into the invention be recording media at all; similarly shaped and sized objects such as business cards, postal cards (e.g., pre-addressed and prepaid business reply cards), and the like may be accommodated by embodiments of the invention that are constructed in accordance with the illustrative embodiments described above.

In particular, while the invention has been described with respect to relatively flat recording media, it should be equally apparent that the thickness of the inserted object is not a limitation on the scope of the invention. In fact, embodiments that incorporate into the invention additional sections to accommodate objects that are relatively thicker than conventional flat disks are equivalent to the invention as defined by the following claims.

We claim:

1. A holder for at least one piece of flat recording media, comprising:

a) a generally rectangular media pocket main section connected by a first fold line to one side of a narrow spine, and a generally rectangular cover section connected by a second fold line to another side of the spine;

b) a generally rectangular inside left section connected by a third fold line to the cover section opposite the spine;

c) a generally rectangular inside right section connected by a fourth fold line to the inside left section opposite the cover section;

d) an upper media pocket side section connected by a fifth fold line to the media pocket main section, and a lower media pocket side section connected by a sixth fold line to the media pocket main section;

e) an upper back panel section connected by a seventh fold line to an upper portion of the inside right section, and a lower back panel section connected by a eighth fold line to a lower portion of the inside right section;

f) a media holding sleeve sized to hold the piece of recording media and formed by attaching the upper and lower media pocket side sections to each other, the media holding sleeve being wrapped behind the inside left section so that the spine is located at a conventional left side of the holder, the inside left section and the inside right section are located in the interior of the holder; and the media holding sleeve lays adjacent a back face of the inside right section; and g) the upper back panel section connected to the lower back panel section with the media holding sleeve lying between the two connected back panel sections and the back face of the inside right section.

2. The media holder of claim 1, in which at least one of the inside left section and the inside right section are approximately 5.275 inches in height and 5.475 inches in width.

3. The media holder of claim 1, in which the cover section is approximately 6.375 inches in width.

4. The media holder of claim 1, in which the media pocket main section is approximately 4.475 inches in width.

5. The media holder of claim 1, in combination with at least one piece of flat recording media, in which, when the media holder is opened, the cover section pushes the assembled media pocket and the media extends at least partially out of the media holder.

6. The holder of claim 1, further comprising an opening in a face of at least one section.

7. A holder for at least one piece of flat recording media, comprising:
   a) a generally rectangular back extension section connected by a first fold line to one side of a narrow spine, and a generally rectangular cover section connected by a second fold line to another side of the spine;
   b) a generally rectangular inside left section connected by a third fold line to the cover section opposite the spine;
   c) a generally rectangular inside right section connected by a fourth fold line to the inside left section opposite the cover section;
   d) a side extension section connected by a fifth fold line to the lower side of the back extension section;
   e) a media pocket main section attached to a side of the side extension section by a sixth fold line, the media pocket main section having upper and lower edge sections;
   f) an upper back panel section connected by a seventh fold line to an upper portion of the inside right section, and a lower back panel section connected by a eighth fold line to a lower portion of the inside right section;
   g) a media holding sleeve sized to hold the piece of recording media and formed by attaching the upper and lower edge sections of the media pocket main section to the side extension section, the media holding sleeve being folded at the sixth fold line and wrapped behind the inside left section so that the spine is located at a conventional left side of the holder, the inside left section and the inside right section are located in the interior of the holder, and the media holding sleeve lays adjacent a back face of the inside right section; and
   h) the upper back panel section connected to the lower back panel section with the media holding sleeve lying between the two connected back panel sections and the back face of the inside right section.

8. The media holder of claim 7, in which at least one of the inside left section and the inside right section are approximately 5 inches in height and 5½ inches in width.

9. The media holder of claim 7, in which the cover section is approximately 6¼ inches in width.

10. The media holder of claim 7, in combination with at least one piece of flat recording media, in which, when the media holder is opened, the cover section pushes the assembled media pocket and the media extends at least partially out of the media holder.

11. The holder of claim 7, further comprising an opening in a face of at least one section.

* * * * *